Patented June 25, 1940

2,205,795

UNITED STATES PATENT OFFICE 2,205,795

STABLE ICE COLOR PRODUCING COMPOSITION

Hans Z. Lecher, Plainfield, Frederic H. Adams, Somerville, and Henry Philip Orem, North Plainfield, N. J., assignors to American Cyanamid Company, New York, N. Y., a corporation of Maine No Drawing. Application December 23, 1939, Serial No. 310,818

10 Claims. (Cl. 8—45)

This invention relates to the art of dyeing and printing with ice colors. Specifically it relates to new dye producing compositions and processes for applying them on various materials, particularly textile materials.

More specifically, the present invention relates to compositions comprising an ice color coupling component and a stabilized diazo compound in which a guanidyl carboxylic acid or a guanidyl sulfonic acid free from azoic coupling groups is chemically combined with a diazotized amine corresponding to the formula:

in which X and Y stand for alkyl, alkoxy, aryloxy, halogen, the nitro group or the group $CF_3$ and which may be further substituted provided that the further substituents are not solubilizing groups.

The stabilized diazo compounds used in the compositions of the present invention are obtained by condensation of the diazotized amines with guanidyl sulfonic or carboxylic acids or their alkali metal or ammonium salts in which the guanidyl group has at least one reactive hydrogen attached to a nitrogen atom and capable of reacting with a diazotized amine. Such stabilized diazo compounds are of high stability and will not couple with ice color coupling components in alkaline media, but may be split by weak acids into the original components.

In the present invention the reaction products of the diazotized amines with guanidyl sulfonic or carboxylic acids or their alkali metal or ammonium salts are not claimed as new chemical compounds. These products are claimed in our copending application Serial Number 289,181 filed August 9, 1939, now Patent No. 2,185,154 of which the present application is in part a continuation.

The present invention is based on the discovery that a coupling reaction will not take place in compositions containing these stabilized diazo compounds and ice color coupling components, either in a solid blend or in alkaline solutions, but does after treatment with weak acids. Therefore these new dye producing compositions are very useful in the art of printing ice colors as they can be stored and shipped as solid blends or as alkaline solutions and can also be used for making up stable alkaline printing pastes without premature dyestuff formation, the color being later developed on the print by treatment with weak acids or acid vapors in the usual manner.

The stabilized diazo compounds used in the compositions of the present invention correspond most probably to the following general formula:

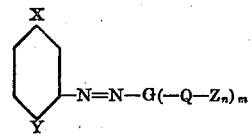

where X and Y stand for halogen, alkyl, alkoxy, aryloxy, the nitro group and the group $CF_3$, G stands for a guanidine radical free from substituents capable of azoic coupling, Q is an aliphatic, aromatic-aliphatic, aromatic, alicyclic or heterocyclic radical incapable of azoic coupling, Z is the carboxylic or sulfonic radical or their alkali metal or ammonium salts, $n$ is 1, 2 or 3 and $m$ is 1 or 2.

It is not certain just where the azo group connects with the guanidine radical and the present invention is not limited to any particular theory of the formula of the compound. The following typical formula is believed to be the most probable one, but it is possible that the azo group or the C=N double bond may be shifted to another nitrogen atom because of tautomerism.

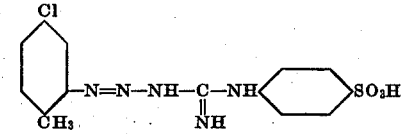

The present invention is not limited to the use of a diazo compound stabilized with any particular guanidyl carboxylic acid or guanidyl sulfonic acid. On the contrary any such stabilizer is useful as long as it contains a reactive hydrogen atom attached to a nitrogen atom and is capable of reacting with diazotized amines of the types referred to. Simple unsubstituted guanidyl carboxylic and sulfonic acids may be used such as, e. g. guanidyl acetic acid (guanyl glycine, glycocyamine), alpha guanidyl propionic acid (guanyl alanine), p-guanidyl benzoic acid, guanidyl ethane sulfonic acid (guanyl taurine); guanidyl propane sulfonic acids such as alpha guanidyl propane beta sulfonic acid, 2-guanidyl-2-methyl propane sulfonic acid, guanidyl cyclohexane sulfonic acids, sulfo-benzyl guanidines; guanidyl benzene sulfonic acids such as guanyl sulfanilic acid or guanyl metanilic acid or guanyl orthanilic acid; guanidyl naphthalene sulfonic acids such as guanyl naphthionic acid or guanyl Tobias acid.

Heterocyclic guanidyl acids such as guanyl proline or guanidyl pyridine carboxylic acids are useful, as are disulfonic acids such as guanyl amino diethane disulfonic acid having the following formula:

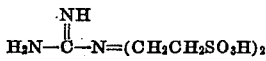

or 2-guanidyl-2-methyl propane-1,3-disulfonic acid; trisulfonic acids such as guanidyl-tri-(sulfomethyl)-methane; dicarboxylic acids such as guanyl glutamic acid and guanidyl acids having both the sulfonic and carboxylic groups such as guanidyl sulfobenzoic acids.

The guanidyl group itself may be substituted as pointed out above. creatine, for example, being a very useful stabilizer. The radical substituting the guanidyl group or connecting the guanidyl groups with the acidic groups may be further substituted provided that the substituent does not make the radical capable of azoic coupling as hydroxyl or amino groups would do with an aromatic radical; thus, 2-chloro-5-guanidyl toluene-4-sulfonic acid may be used as stabilizer.

Typical amines from which stabilized diazo compounds of the present invention may be prepared are, e. g., the following ones: 2,5-difluoroaniline, 2,5-dichloroaniline, 2-fluoro-5-chloroaniline, 3-amino-4-chloro benzo trifluoride; 2-methyl-5-chloroaniline, 5-methyl-2-chloroaniline, 2-methyl-5-nitroaniline; 2-methoxy-5-methyl aniline, 2-methyl-5-methoxyaniline, 2,5-dimethoxyaniline, 2-methoxy-5-chloroaniline, 2-methoxy-5-bromoaniline, 4-chloro-2-amino-diphenyl ether, 4-amino-2-chloro diphenyl ether, 2-methoxy-5-nitroaniline.

Since the stabilized diazo compounds used in the present invention contain a solubilizing sulfonic group or carboxylic group, they are soluble in aqueous alkali or in aqueous solution of ammonia, of amines or of quaternary ammonium bases. While in the case of alkali and of the strong quaternary ammonium bases such as tetraethanol ammonium hydroxide only an equivalent amount, or a slight excess, of the base is required to promote solution, in the case of the weaker bases such as ammonia and the various amines, a larger excess is required.

These diazo compounds are, for the most part, yellow in color. They are very stable even at elevated temperatures and not explosive which is important as many diazo compounds present considerable explosion hazard. The ready solubility of these diazo compounds in solutions of bases quoted above, and their stability against hydrolysis in alkaline solution is another important property and constitutes one advantage of the present invention.

The stabilized diazo compounds of the present invention are split by acid in aqueous solution and regenerate the component parts of the molecules. The ease with which the stabilized diazo compounds are split by acid will, of course, differ with different compounds, but in most cases heating with acetic acid is sufficient to effect splitting. From the practical point of view, it is important that in this manner an ice color component can be converted into a very stable diazo compound from which, however, the diazotized amine may be easily regenerated by the aid of acids.

Because of these desirable properties the stable diazo compounds of the present invention can be used mixed with ice color coupling components in alkaline printing pastes. Prints can be developed with steam containing vapors of weak acids such as formic or acetic acids. When the diazo compounds of the present invention are used in the form of salts with weak and volatile amines or are dissolved by the aid of weak and volatile amines such as, e. g., diethyl ethanolamine, the development of the color may be accomplished by steam only without any additional acid because the steam removes the amine and decreases the alkalinity of the printing paste. The same is true if there is added to the printing paste a potential acidic substance which will produce an acid on steaming, such as, e. g., sodium monochloroacetate, the monoacetyl ester of glycerine, ethylene monochlorohydrin, formamide, etc. Furthermore, in making up the printing paste if insufficient amounts of base are used and some of the stabilized diazo compound and the coupling component remains undissolved, the prints may be developed with steam alone, without any addition of acid or of a potential acidic substance.

The stabilized diazo compounds are preferably used in the form of soluble salts such as alkali metal salts, ammonium salts, salts with quaternary ammonium bases, etc.

The stabilized diazo compounds may be combined with any of the ice color coupling components such as naphthols, pyrazolones, hydroxybenzofluorenones, benzoyl naphthols, and various N-substituted amides, particularly arylides of 2-hydroxy-3-naphthoic acid and of its 5,6,7,8-tetrahydro derivative, of 2-hydroxy-3-anthroic acid, of methyl and dimethyl salicylic acids, of hydroxy carbazole carboxylic acids, of hydroxy benzocarbazole carboxylic acids, of acetoacetic acid, of furoyl acetic acid, of terephthaloyl-bisacetic acid, of hydroxy dibenzofuran carboxylic acids, of hydroxy dibenzothiophene-carboxylic acids, etc.

The relative proportions of the two components present in this new composition of matter may vary; however, we prefer to use approximately equivalent quantities, the coupling component being in slight excess. The mixture may contain one or more stabilized diazo compounds and one or more ice color coupling components since desirable shades are also obtained by using more than two components.

The mixture may be a solid blend or it may be in the form of a solution either in water or in a polar organic solvent having sufficient solvent action on the stabilized diazo compound and on the naphthol, e. g., in an alcohol. Solutions must be kept slightly on the alkaline side in order to avoid premature formation of dyestuff.

The mixtures, either solid or liquid may contain also various assistants such as starches, gum, alkali, quaternary ammonium bases, wetting and dipersing agents.

The textile material is printed or impregnated with the mixture and then treated with an acid, preferably a weak acid, at elevated temperature. By this acid treatment the diazo-guanidine compound is hydrolyzed and coupled to form the azo dye. Acetic and formic acids give very favorable results, but many other weak acids, known to those skilled in the art, may be used with equally good effect. The acids may be applied either in the liquid or vapor state.

However, the ice color coupling component and the diazo compound need not be applied simultaneously, but the diazo compound may be applied after the coupling component with the same result.

When the ice color coupling component and stable diazo compound are printed as a mixture, it is possible to effect ageing in a somewhat different manner from that described above. The goods, if sufficiently acid resistant, such as animal fibres, may be impregnated with an acid substance such as, e. g., sulfuric acid, sodium bisulfate and the like. The print is then made and the material steamed. The acid in the material effects splitting and develops the color. This method of impregnating the goods with an acid is not practical with materials which are not acid resistant, such as the various cellulosic fibres. In such a case, however, it is possible to use a material which liberates acid only when treated with steam. Such potential acidic substances are, e. g., sodium monochloroacetate, esters of acids that are hydrolyzed by steam such as glycerine monoacetate, ethylene monochlorhydrin, acid amides such as formamide, etc. The acid yielding material may be mixed with the printing paste, or the goods to be printed may be padded with the agent.

The processes of this invention produce excellent dyeings and printings on textile material as no side reactions take place in the formation of the azo dye. A further advantage is that the mixtures of the diazo compounds and the ice color coupling components are perfectly stable so that they may be stored without decomposition and explosion hazard. Furthermore, their alkaline printing pastes show a very high degree of stability and no premature formation of azo dyestuff takes place.

The processes of the present invention may also be used for simultaneous or separate printing with a different class of dyes, namely, the sulfuric acid esters of leuco compounds of vat dyes. It is an advantage of the present invention that composite prints are thus possible and it is not necessary to restrict the printing of goods to dyes of a single class.

Some typical mixtures of the present invention and their use in dyeing and printing textile materials will be illustrated in the following specific examples, it being understood, of course, that the invention is not broadly limited to particular details herein set forth. The parts are by weight.

*Example 1*

3.93 parts of 2-methyl-5-chloroaniline hydrochloride are mixed with 8.7 parts of 5N hydrochloric acid and 40 parts of water, iced to 5° C., and diazotized by the addition of 21 parts of normal sodium nitrite solution. The diazo solution so prepared is run into a solution of 4.5 parts of guanyl sulfanilic acid

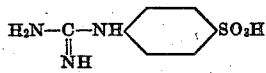

in 200 parts of water, 8.7 parts of 5N sodium hydroxide and 44 parts of 0.5N sodium carbonate. A yellow precipitation occurs during the reaction. After a half hour the reaction is complete as indicated by a negative test for free diazo. 100 parts of salt are added and the yellow precipitate is filtered and dried at room temperature.

4.66 parts of this product (containing 88.5% real stabilized diazo compound) are intimately mixed with 2.77 parts of 2-hydroxynaphthalene-3-carboxylic acid ortho-toluidide and 0.15 part of the sodium salt of sulfosuccinic acid diamyl ester and a little 2-ethylhexanol. 5 parts of this mixture are pasted with 5 parts of ethylene glycol-monoethyl ether, and 2.5 parts of 30° Bé. sodium hydroxide solution. 17.5 parts of warm water are added to the mixture and this is thickened by the addition of 70 parts of gum starch tragacanth solution. This printing paste is printed on cotton from a copper roll, the print is dried, aged by steam in the presence of acetic acid vapors, rinsed, soaped at elevated temperatures, rinsed again and dried. A bright red print of good strength is obtained.

*Example 2*

3.2 parts of 2-methoxy-5-chloroaniline, 17 parts of water and 8.7 parts of 5N hydrochloric acid are cooled to 3° C. and diazotized with 1.4 parts of sodium nitrite.

3.3 parts of creatine are added to 14.6 parts of 5N NaOH, and the diazo solution as prepared is added slowly at 5° C. 1.2 parts of glacial acetic acid are then added and the solution stirred until reaction is complete. 4.7 parts of 5N NaOH and 100 parts of water are added, the solution is heated to 50° C. and filtered. 28 parts of potassium chloride are added for each 100 parts of solution and the solution is cooled to 15° C. The precipitate is filtered off and dried.

3 parts of the product (containing 93% real stabilized diazo compound) are blended with 1.7 parts of bis-acetoacetyl-benzidide, converted into a printing paste as in Example 1, and printed on cotton from a copper roll, dried, aged by steam in the presence of acetic acid vapors, rinsed, soaped at elevated temperatures, rinsed and dried. A sharp yellow print of very good strength and fastness properties is obtained.

*Example 3*

8.9 parts of 2-methyl-5-chloroaniline hydrochloride are slurried with 100 parts of water and 21 parts of 5N hydrochloric acid. The solution is cooled to 3° C. and 51.5 parts of normal sodium nitrite solution are added slowly with stirring until diazotization is complete. 7.9 parts of creatine are added to the solution and 37.8 parts of 5N sodium hydroxide are added slowly with stirring. Then 7.2 parts of 20% acetic acid are added and the solution stirred until all active diazo has disappeared. The solution is filtered and 40 parts of sodium chloride are added. It is carefully acidified with hydrochloric acid to an acid test to Congo red paper. The crystalline product is filtered off and dried.

3.9 parts of this product (containing 76% real stabilized diazo compound) are intimately mixed with 2.9 parts of 2-hydroxynaphthalene-3-carboxylic acid o-toluidide. 5 parts of this mixture are pasted with 5 parts of ethylene glycol mono-ethyl ether and 2.5 parts of 30° Bé. sodium hydroxide solution. 17.5 parts of water are added to the mixture and this is thickened by the addition of 70 parts of neutral gum starch tragacanth solution. This printing paste is printed on cotton from a copper roll, dried, aged by steam in the presence of acetic acid vapors rinsed, soaped at elevated temperature, rinsed and dried. A sharp red print of very good fastness properties is obtained.

*Example 4*

3.9 parts of 2-methyl-5-chloroaniline hydrochloride are stirred in a mixture of 30 parts of water and of 8.7 parts of 5N hydrochloric acid at 3° C. It is diazotized by adding 1.4 parts of sodium nitrite. After diazotization is complete, 3.3 parts of creatine are added to the solution, then 5.2 parts of sodium bicarbonate, followed by the addition of 8.7 parts of 5N sodium hydroxide. After ½ hour, 4.6 parts of 5N sodium hydroxide are added to a positive test to phenolphthalein.

After the reaction is complete, 15 parts of salt are added for each 100 parts of solution and the crystalline product filtered off and dried.

3.5 parts of the material (containing 75% real stabilized diazo compound) are blended with 1.5 parts of bis-acetoacetyl-benzidide and 0.2 part of urea and the blend converted into a printing paste which is printed on cotton in a manner similar to that used in Example 3. The print is a golden yellow of very good fastness properties.

Isolation of the stabilized diazo compound from the above reaction solution is also accomplished by addition of 70 parts of potassium carbonate for each 100 parts of the reacted solution.

2.9 parts of this material are blended with 1.6 parts of 2-hydroxynaphthalene-3-carboxylic acid o-phenetidide. When the blend is converted to a print paste and printed as in Example 3, a bright scarlet print is obtained.

*Example 5*

A diazo solution is prepared as in Example 4 from 3.9 parts of 2-methyl-5-chloroaniline hydrochloride and this is reacted with 5.2 parts of guanyl glycine

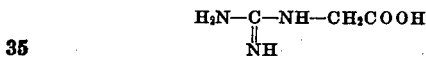

in the presence of 3 parts of sodium acetate and 59 parts of 5N sodium hydroxide which is added in two portions, allowing one hour to elapse before the addition of the second portion. After reaction is complete, the product is heated to 70° C., filtered, and the residue extracted with a second portion of water at 70° C.

22 parts of salt are added for each 100 parts of solution, the solution is cooled to 15° C., filtered, and the product is dried.

3.8 parts of the product (containing 77% real stabilized diazo compound) blended with bis-acetoacetyl-o-toluidide, converted to a printing paste and printed as in Example 3 give a bright yellow print of good fastness properties.

*Example 6*

9.6 parts of 2-methyl-5-chloroaniline hydrochloride are slurried in 106 parts of water and 5 parts of 38% hydrochloric acid. The mixture is cooled and diazotized with 3.5 parts of sodium nitrite. Then 11 parts of guanyl orthanilic acid (prepared from o-aminobenzene sulfonic acid and cyanamide) are added to the solution which is made alkaline by the aid of potassium hydroxide solution. The reaction starts immediately and is complete in about one hour. The material is salted out by the aid of potassium carbonate, filtered and dried.

This product blended with an equivalent quantity of 2-hydroxy-3-naphthoic acid o-toluidide and made up into a printing paste in the customary manner, printed and acid aged, gives a very good red print.

Instead of guanyl orthanilic acid, guanyl metanilic acid (prepared from m-aminobenzene sulfonic acid and cyanamide in the presence of ammonia) may be used for the stabilization of diazotized 2-methyl-5-chloroaniline, the procedure being essentially the same. A printing paste containing this product and the o-anisidide of 2-hydroxy-3-naphthoic acid as coupling component gives a very good scarlet print.

*Example 7*

3.15 parts of 2-methoxy-5-chloroaniline are dissolved in a mixture of 13 parts of 16.86% hydrochloric acid and 40 parts of water by heating. The solution is cooled and diazotized by the addition of 20 parts 6.9% sodium nitrite solution. The diazo solution is filtered and added to a stirred solution containing 4.5 parts guanyl sulfanilic acid, 1.6 parts sodium hydroxide, 4.24 parts sodium carbonate and 248 parts of water at 25°–30° C. After half an hour's stirring, 0.2 part of sodium hydroxide is added in the form of a solution and 10 minutes later the diazo test with R salt disappears. The resulting solution is cooled and the stabilized diazo compound is salted out by the aid of potassium carbonate. The yellow product is filtered off and dried.

This product is blended with an equivalent amount of the o-anisidide of 2-hydroxy-3-naphthoic acid. 5 parts of this blend are made up into a printing paste with 5 parts ethylene glycol monoethyl ether, 2.5 parts caustic soda solution 30° Bé., 17.5 parts water and 70 parts starch tragacanth gum. If printed on cotton cloth and aged by steam containing acetic acid vapors, a very good bluish red print is obtained.

Instead of isolating the stabilized diazo compounds in the solid state by filtration as described in the foregoing examples, it is also possible to extract them with organic solvents such as acetone which is particularly advantageous when ice color producing solutions containing the stabilized diazo compound and the naphthol are prepared.

What we claim is:

1. A color producing composition of matter which comprises an ice color coupling component and a stabilized diazo compound having the following general formula:

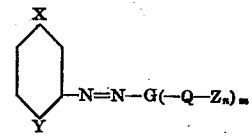

in X and Y are radicals included in the group consisting of alkyl, alkoxy, aryloxy, nitro, halogen and $CF_3$ radicals, G is a guanidyl radical free from substituents capable of azoic coupling, Q is a radical incapable of azoic coupling and included in the group consisting of aromatic, aromatic-aliphatic, aliphatic and alicyclic radicals, Z is a member of the group consisting of carboxylic acid radicals, sulfonic acid radicals and their alkali metal and ammonium salts, and $n$ is a whole number included in the group consisting of 1, 2 and 3 and $m$ is a whole number included in the group consisting of 1 and 2.

2. A color producing composition of matter which comprises an ice color coupling component and a stabilized diazo compound having the following general formula:

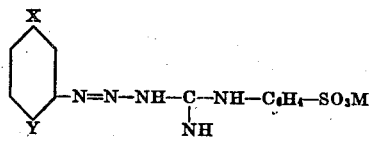

in which X and Y are radicals included in the group consisting of alkyl, alkoxy, aryloxy, nitro, halogen and CF₃ radicals, and M is a member of the group consisting of hydrogen, alkali metals and ammonium radicals.

3. A color producing composition of matter which comprises an ice color coupling component and a stabilized diazo compound having the following general formula:

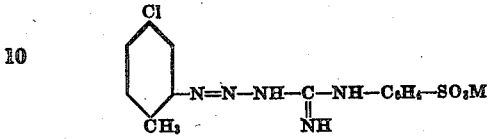

in which M is a member of the group consisting of hydrogen, alkali metals and ammonium radicals.

4. A color producing composition of matter which comprises the benzidide of acetoacetic acid and a stabilized diazo compound having the following formula:

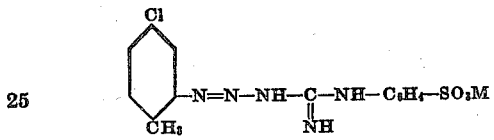

in which M is a member of the group consisting of hydrogen, alkali metals and ammonium radicals.

5. A color producing composition of matter which comprises the o-toluidide of 2-hydroxy-3-naphthoic acid and a stabilized diazo compound having the following formula:

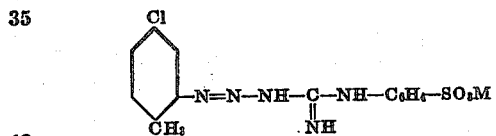

in which M is a member of the group consisting of hydrogen, alkali metals and ammonium radicals.

6. A color producing composition of matter which comprises the o-phenetidide of 2-hydroxy-3-naphthoic acid and a stabilized diazo compound having the following formula:

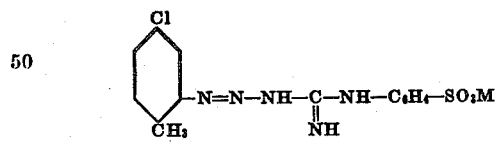

in which M is a member of the group consisting of hydrogen, alkali metals and ammonium radicals.

7. An alkaline printing paste comprising a printing thickener associated with a mixture of an ice color coupling component and a stabilized diazo compound having the following general formula:

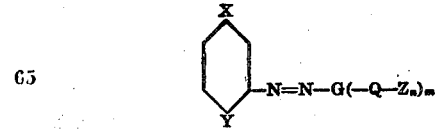

in which X and Y are radicals included in the group consisting of alkyl, alkoxy, aryloxy, nitro, halogen and CF₃ radicals, G is a guanidyl radical free from substituents capable of azoic couplings, Q is a radical incapable of azoic coupling and included in the group consisting of aromatic, aromatic-aliphatic, aliphatic and alicyclic radicals, Z is a member of the group consisting of carboxylic acid radicals, sulfonic acid radicals and their alkali metal and ammonium salts, and $n$ is a whole number included in the group consisting of 1, 2 and 3 and $m$ is a whole number included in the group consisting of 1 and 2.

8. A process of coloring materials which comprises applying to the material a composition containing an ice color coupling component and a stabilized diazo compound having the following general formula:

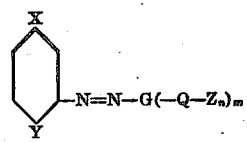

in which X and Y are radicals included in the group consisting of alkyl, alkoxy, aryloxy, nitro, halogen and CF₃ radicals, G is a guanidyl radical free from substituents capable of azoic coupling, Q is a radical incapable of azoic coupling and included in the group consisting of aromatic, aromatic-aliphatic, aliphatic and alicyclic radicals, Z is a member of the group consisting of carboxylic acid radicals, sulfonic acid radicals and their alkali metal and ammonium salts, and $n$ is a whole number included in the group consisting of 1, 2 and 3 and $m$ is a whole number included in the group consisting of 1 and 2, and subjecting the material to the action of weak acids at elevated temperature.

9. A method of printing which comprises printing the material with an alkaline printing paste containing a mixture comprising an ice color coupling component and a stabilized diazo compound having the following general formula:

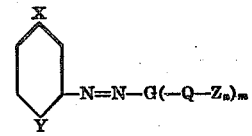

in which X and Y are radicals included in the group consisting of alkyl, alkoxy, aryloxy, nitro, halogen and CF₃ radicals, G is a guanidyl radical free from substituents capable of azoic coupling, Q is a radical incapable of azoic coupling and included in the group consisting of aromatic, aromatic-aliphatic, aliphatic and alicyclic radicals, Z is a member of the group consisting of carboxylic acid radicals, sulfonic acid radicals and their alkali metal and ammonium salts, and $n$ is a whole number included in the group consisting of 1, 2 and 3 and $m$ is a whole number included in the group consisting of 1 and 2, and developing the color by subjecting the material to the action of a weak acid at elevated temperature.

10. A method of coloring material which comprises applying to the material an ice color coupling component, then applying a dispersion of a stabilized diazo compound having the following general formula:

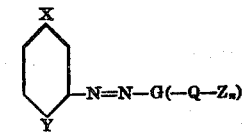

in which X and Y are radicals included in the group consisting of alkyl, alkoxy, aryloxy, nitro, halogen and CF₃ radicals, G is a guanidyl radical free from substituents capable of azoic coupling, Q is a radical incapable of azoic coupling and included in the group consisting of aromatic, aromatic-aliphatic, aliphatic and alicyclic radicals, Z is a member of the group consisting of carboxylic acid radicals, sulfonic acid radicals and their alkali metal and ammonium salts, and $n$ is a whole number included in the group consisting of 1, 2 and 3 and $m$ is a whole number included in the group consisting of 1 and 2, and then developing the color by subjecting the material to the action of a weak acid at elevated temperature.

HANS Z. LECHER.
FREDERIC H. ADAMS.
HENRY PHILIP OREM.

DISCLAIMER 2,205,795.—*Hans Z. Lecher*, Plainfield, *Frederic H. Adams*, Somerville, and *Henry Philip Orem*, North Plainfield, N. J. STABLE ICE COLOR PRODUCING COMPOSITION. Patent dated June 25, 1940. Disclaimer filed June 17, 1942, by the assignee, *American Cyanamid Company*.

Hereby disclaims claims 1, 2, 3, 7, 8, 9, and 10.

[*Official Gazette July 21, 1942.*]